United States Patent
Spierling (10) Patent No.: US 11,242,156 B2
(45) Date of Patent: Feb. 8, 2022

(54) PLUG IN FLUID COOLED ELECTRICAL CONNECTIONS FOR TAIL CONE MOUNTED GENERATOR

(71) Applicant: Hamilton Sundstrand Corporation, Charlotte, NC (US)

(72) Inventor: Todd A. Spierling, Rockford, IL (US)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 88 days.

(21) Appl. No.: 16/354,335

(22) Filed: Mar. 15, 2019

(65) Prior Publication Data

US 2020/0290744 A1    Sep. 17, 2020

(51) Int. Cl.
*B64D 27/24* (2006.01)
*B64D 27/10* (2006.01)
(Continued)

(52) U.S. Cl.
CPC ............ *B64D 27/24* (2013.01); *B64D 27/10* (2013.01); *B64D 33/08* (2013.01); *F01D 15/10* (2013.01); *F02C 7/18* (2013.01); *F02K 3/065* (2013.01); *H02K 7/1823* (2013.01); *H02K 9/19* (2013.01); *F05D 2220/323* (2013.01); *F05D 2220/50* (2013.01)

(58) Field of Classification Search
CPC ........ B64D 27/10; B64D 27/24; B64D 33/08; F02C 7/18; F02K 3/065; H02K 7/1823; H02K 9/19
See application file for complete search history.

(56) References Cited

U.S. PATENT DOCUMENTS 2,696,712 A * 12/1954 Lewis ................. F02C 7/32
                                                60/39.83
2,853,854 A *  9/1958 Avery ................. F02C 7/042
                                                60/39.83
(Continued)

FOREIGN PATENT DOCUMENTS

EP    2708701 A2    3/2014
EP    3023601 A1    5/2016

OTHER PUBLICATIONS

European Search Report for application No. 19211842.0 filed on Nov. 27, 2019; dated Jul. 27, 2019; 8 pages.

*Primary Examiner* — Sean Gugger
(74) *Attorney, Agent, or Firm* — Cantor Colburn LLP (57) ABSTRACT

A gas turbine engine including: a tail cone; a low pressure compressor; a low pressure turbine; a low speed spool interconnecting the low pressure compressor and the low pressure turbine; and an electric generator located within the tail cone, the electric generator being operably connected to the low speed spool, wherein the electric generator includes a coolant cavity in thermal communication with one or more components of the electric generator; a structural support housing at least partially enclosing the electric generator, the structural support housing including a forward wall located on a forward end of the structural support housing, wherein the forward wall includes a first opening; a first coolant conveying tube extending through the first opening to fluidly connect to the coolant cavity; and a first electrical connector tube extending through the first opening within the first coolant conveying tube to electrically connect to the electric generator.

11 Claims, 4 Drawing Sheets

(51) Int. Cl.
  *B64D 33/08* (2006.01)
  *F01D 15/10* (2006.01)
  *F02C 7/18* (2006.01)
  *F02K 3/065* (2006.01)
  *H02K 7/18* (2006.01)
  *H02K 9/19* (2006.01)

(56) References Cited

U.S. PATENT DOCUMENTS

| | | | | |
|---|---|---|---|---|
| 2,958,192 | A * | 11/1960 | Dresselhaus | F02C 3/06 60/804 |
| 4,370,023 | A * | 1/1983 | Lange | G02B 6/4427 385/111 |
| 6,182,435 | B1 * | 2/2001 | Niggemann | B64D 41/00 60/266 |
| 6,247,668 | B1 * | 6/2001 | Reysa | B64D 41/00 244/53 B |
| 6,427,574 | B1 * | 8/2002 | Callahan | F41F 3/07 89/1.81 |
| 7,841,163 | B2 * | 11/2010 | Welch | F02C 7/32 60/39.091 |
| 8,280,467 | B2 * | 10/2012 | Yuan | H01L 39/00 505/163 |
| 10,422,282 | B2 * | 9/2019 | Williams | F02C 7/00 |
| 2009/0165464 | A1 * | 7/2009 | Gotz | F02C 7/32 60/802 |
| 2010/0180568 | A1 * | 7/2010 | Sachs | F02C 5/02 60/39.511 |
| 2013/0133336 | A1 * | 5/2013 | Barnett | F01D 25/164 60/802 |
| 2014/0079530 | A1 * | 3/2014 | Ferch | F02C 7/12 415/1 |
| 2016/0149469 | A1 * | 5/2016 | Lemmers | F01D 25/20 290/1 A |
| 2016/0160863 | A1 * | 6/2016 | Roach | F01D 5/282 415/119 |
| 2018/0305036 | A1 * | 10/2018 | Vondrell | B60L 50/16 |
| 2019/0014687 | A1 * | 1/2019 | Snyder | F02C 7/16 |
| 2019/0316486 | A1 * | 10/2019 | Roberge | H02K 7/116 |
| 2020/0007007 | A1 * | 1/2020 | Haran | B64D 33/08 |
| 2020/0047908 | A1 * | 2/2020 | Filipenko | B64D 27/10 |

* cited by examiner

PLUG IN FLUID COOLED ELECTRICAL CONNECTIONS FOR TAIL CONE MOUNTED GENERATOR

BACKGROUND

The subject matter disclosed herein generally relates to gas turbine engines, and more specifically to electrical generators for gas turbine engines.

Conventional gas turbine engines are often tight on free space due to envelope constraints. Therefore innovative space-saving designs and architectures are often sought out when integrating new components into the gas turbine engine.

BRIEF SUMMARY

According to one embodiment, a gas turbine engine is provided. The gas turbine engine including: a tail cone; a low pressure compressor; a low pressure turbine; a low speed spool interconnecting the low pressure compressor and the low pressure turbine; and an electric generator located within the tail cone, the electric generator being operably connected to the low speed spool, wherein the electric generator includes a coolant cavity in thermal communication with one or more components of the electric generator; a structural support housing at least partially enclosing the electric generator, the structural support housing including a forward wall located on a forward end of the structural support housing, wherein the forward wall includes a first opening; a first coolant conveying tube extending through the first opening to fluidly connect to the coolant cavity; and a first electrical connector tube extending through the first opening within the first coolant conveying tube to electrically connect to the electric generator.

In addition to one or more of the features described above, or as an alternative, further embodiments may include that the forward wall further includes at a second opening and the gas turbine engine further includes: a second coolant conveying tube extending through the second opening to fluidly connect to the coolant cavity; and a second electrical connector tube extending through the second opening within the second coolant conveying tube to electrically connect to the electric generator.

In addition to one or more of the features described above, or as an alternative, further embodiments may include that the first coolant conveying tube is operable to supply coolant to the coolant cavity.

In addition to one or more of the features described above, or as an alternative, further embodiments may include that the first coolant conveying tube is operable to supply coolant to the coolant cavity.

In addition to one or more of the features described above, or as an alternative, further embodiments may include that the second coolant conveying tube is operable to remove coolant from the coolant cavity.

In addition to one or more of the features described above, or as an alternative, further embodiments may include that the second coolant conveying tube is operable to remove coolant from the coolant cavity.

In addition to one or more of the features described above, or as an alternative, further embodiments may include that the first opening is located gravitationally above the second opening.

In addition to one or more of the features described above, or as an alternative, further embodiments may include: a heat rejection heat exchanger fluidly connected to the first coolant conveying tube and the second coolant conveying tube.

In addition to one or more of the features described above, or as an alternative, further embodiments may include: a bypass duct, wherein the heat rejection heat exchanger is in thermal communication with the bypass duct.

In addition to one or more of the features described above, or as an alternative, further embodiments may include a bypass duct, wherein the heat rejection heat exchanger is located within the bypass duct.

According to another embodiment, an electric generation system for a gas turbine engine is provided. The electric generation system including: a tail cone; an electric generator located within the tail cone, the electric generator including a coolant cavity in thermal communication with one or more components of the electric generator; a structural support housing at least partially enclosing the electric generator, the structural support housing including a forward wall located on a forward end of the structural support housing, wherein the forward wall includes a first opening; a first coolant conveying tube extending through the first opening to fluidly connect to the coolant cavity; and a first electrical connector tube extending through the first opening within the first coolant conveying tube to electrically connect to the electric generator.

In addition to one or more of the features described above, or as an alternative, further embodiments may include that the forward wall further includes at a second opening and the electric generation system further includes: a second coolant conveying tube extending through the second opening to fluidly connect to the coolant cavity; and a second electrical connector tube extending through the second opening within the second coolant conveying tube to electrically connect to the electric generator.

In addition to one or more of the features described above, or as an alternative, further embodiments may include that the first coolant conveying tube is operable to supply coolant to the coolant cavity.

In addition to one or more of the features described above, or as an alternative, further embodiments may include that the first coolant conveying tube is operable to supply coolant to the coolant cavity.

In addition to one or more of the features described above, or as an alternative, further embodiments may include that the second coolant conveying tube is operable to remove coolant from the coolant cavity.

In addition to one or more of the features described above, or as an alternative, further embodiments may include that the second coolant conveying tube is operable to remove coolant from the coolant cavity.

In addition to one or more of the features described above, or as an alternative, further embodiments may include that the first opening is located gravitationally above the second opening.

In addition to one or more of the features described above, or as an alternative, further embodiments may include a heat rejection heat exchanger fluidly connected to the first coolant conveying tube and the second coolant conveying tube.

In addition to one or more of the features described above, or as an alternative, further embodiments may include that the electric generator is configured to connect to a low speed spool of the gas turbine engine.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

High pressure spools of gas turbine engines may be used to drive accessories of the gas turbine engine. However, as engine bypass ratios increase, the capability of a high pressure spool to drive accessories, such as electric generators, has been diminished. Therefore it is desirable to drive accessories off of a low pressure spool of the gas turbine engine. Gas turbine engines typically drive accessories through a radial tower shaft and accessory gearbox operably connected to the high pressure spool, however connecting to the low pressure spool is more challenging.

Gas turbines may also include a tail cone at the rear of the engine to help accelerate the exhaust flow and create additional thrust. The enclosed area within this tail cone is typically empty space, and is also adjacent to the rotating low pressure spool. Embodiments disclosed herein seek to take advantage of this empty space by locating an electric generator within the tail cone and operably connecting the electric generator to the low speed spool such that the electric generator is driven by the low speed spool. High temperatures within the area of the tail cone complicate locating a generator within the tail cone and therefore embodiments disclosed herein also seek to address the challenges of locating the generator within the potentially high temperature environment of the tail cone.

Figure 1:
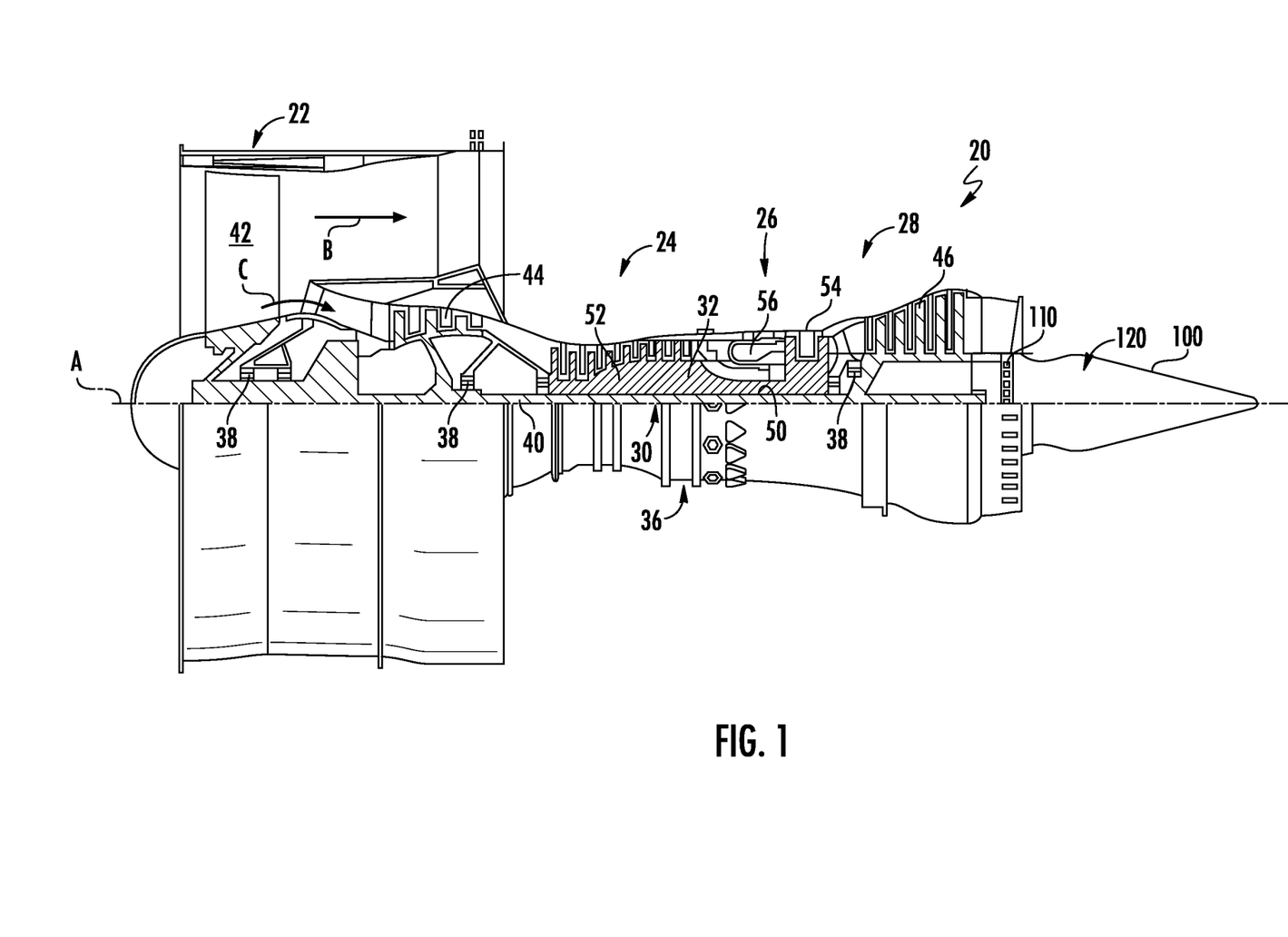
FIG. 1 is a partial cross-sectional illustration of an example gas turbine engine.

FIG. 1 schematically illustrates an example gas turbine engine 20 that may incorporate embodiments of the present disclosure. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The fan 42 may be driven at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A, which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbine section 28 rotationally drives the respective low speed spool 30 and high speed spool 32 in response to the expansion. It will be appreciated that each of the positions of the fan section 22, compressor section 24, combustor section 26, and turbine section 28, may be varied.

The engine 20 in one example is a high-bypass geared aircraft engine. In a further example, the engine 20 bypass ratio is greater than about six (6), with an example embodiment being greater than about ten (10). In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. A significant amount of thrust is provided by the bypass flow B due to the high bypass ratio.

The engine 20 includes a tail cone 100 located on a rear portion of the engine 20. The tail cone 100 is operably shaped to help accelerate the exhaust air flow exiting the core flow path C and create additional thrust for the engine 20. The tail cone 100 may be securely fastened to the engine 20 via a plurality of fasteners 110 to a structural portion of the engine 20. The structural portion of the gas turbine engine 20 may be the engine static structure 36. The plurality of fasteners 110 may be arranged circumferentially around the engine central longitudinal axis A. The tail cone 100 may be securely fastened to the engine 20 in a cantilevered arrangement, as shown in FIG. 1. The tail cone 100 includes a hollow interior space 120 within the tail cone 100. Conventional gas turbine engines typically leave this interior space empty and unused, however embodiments disclosed herein seek to utilize this interior space 120 by locating an electric generator within the interior space 120, as discussed further herein.

Figure 2:
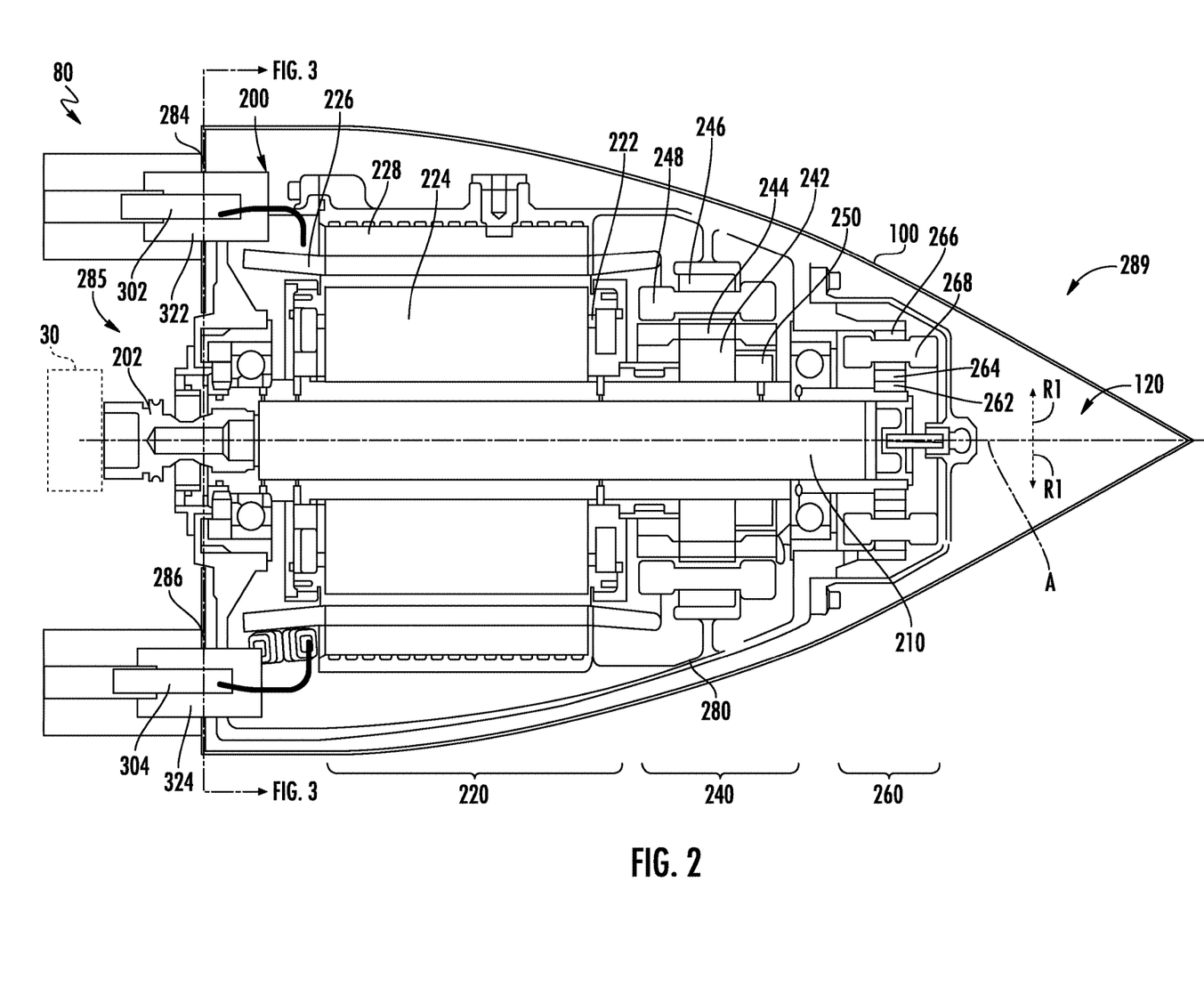
FIG. 2 is a cross-sectional illustration of an electric generation system for the gas turbine engine of FIG. 1 according to an embodiment of the present disclosure.

Referring now to FIG. 2, with continued reference to FIG. 1, a cross-section view of an electric generator 200 located within the interior space 120 of the tail cone 100 is illustrated, in accordance with an embodiment of the present disclosure. The combination of the electric generator 200 and the tail cone 100 may be considered an electric generation system 80 for the gas turbine engine 20 of FIG. 1. The electric generator 200 may be operably connected to the low speed spool 30 of the engine 20. A drive shaft coupling 202 may operably connect a shaft 210 of the electric generator 200 to the low speed spool 30. The low speed spool 30 is configured to rotate the shaft 210 of the electric generator 200 and the electric generator 200 is configured to generate electricity in response to the rotation of the shaft 210. The electricity generated by the electric generator 200 may be provided to the engine 20 and/or the aircraft to power various electrical devices.

The electric generator 200 may be a three-stage electrical generator that includes a main generator 220, an exciter generator 240, and a permanent magnet generator 260. It is understood that while a three-stage wound field synchronous electrical generator 200 is illustrated, the embodiments disclosed herein may be applied to other electrical generators including but not limited to a permanent magnet electrical generator, an induction electrical generator, a switched reluctance electrical generator, or any other electrical generator known to one of skill in the art.

The main generator 220, the exciter generator 240, and the permanent magnet generator 260 may each be brushless. The main generator 220 includes a main field winding 224 on a rotating portion 222 and a generator armature winding 228 of a stationary portion 226. The exciter generator 240 includes a rotating exciter armature winding 244 on a rotating portion 242 and an exciter winding 248 on a stationary portion 246. The permanent magnet generator 260 includes permanent magnets 264 employed on a rotating portion 262 and a winding 268 on a stator portion 266. The rotating portion 222 of the main generator 220, the rotating portion 242 of the exciter generator 240, and the rotating portion 262 of the permanent magnet generator 260 may each be operably connected to the shaft 210 of the electric generator 200 and configured to rotate with the shaft 210 around the engine central longitudinal axis A.

The rotation of permanent magnets 264 generates an alternating current voltage on windings 268 of the stator portion 266. The AC voltage provided by the permanent magnet generator 260 is rectified and selectively applied to an exciter winding 248 on a stationary portion 246 of the exciter generator 240. The exciter winding 248 generates a field that interacts with rotating exciter armature windings 244 on a rotating portion 242 of the exciter generator 240 to provide an AC voltage. A rotating rectifier assembly 250 rectifies the AC voltage and supplies the DC voltage to a main field winding 224 on the rotating portion 222 of the main generator 220. The rotating portion 224 may be operably connected to the low speed spool 30 through the shaft 210 and configured to rotate when the low speed spool 30 rotates. Rotation of the shaft 210 and the main field winding 224 induces three-phase AC output voltage on the generator armature winding 228 of the stationary portion 226 of the main generator 220.

The electric generator 200 is incased in a structural support housing 280 that provides structure support for the electric generator 200. The structural support housing 280 may be securely attached to a support structure (e.g., the engine static structure 36) of the gas turbine engine 20. The structural support housing 280 may be securely fastened to the engine 20 in a cantilevered arrangement, as shown in FIG. 1. The structural support housing 280 may at least partially enclose the electric generator 200. The structural support housing 280 may fully enclose the electric generator 200 with the exception of the drive shaft coupling 202 extending through the structural support housing 280 to connect to the low speed spool 30.

In order to transport electricity generated by the electric generator out of the electric generator 200, the electric generator 200 may include electrical connectors. Electric generators may utilize electrical connectors that extend radially outward from the engine central longitudinal axis A in about the R1 direction. However this electrical connector arrangement may not work for the electrical generator 200 illustrated in FIG. 2 because extending electrical connectors radially outward from the engine central longitudinal axis A in about the R1 direction would place the electrical connectors in an area either proximate the tail cone 100 or through the tail cone 100, which may see elevated temperatures during operation of the engine 20. Embodiments disclosed herein seek to protect the electrical connectors of the electric generator 200 from these elevated temperatures. Electrical connectors 302, 304 (see FIG. 3) may protrude through a forward wall 282 of the structural support housing 280. The forward wall 282 is located on a forward end 285 of the structural support housing 280. The forward end 285 is opposite an aft end 289.

Figure 3:
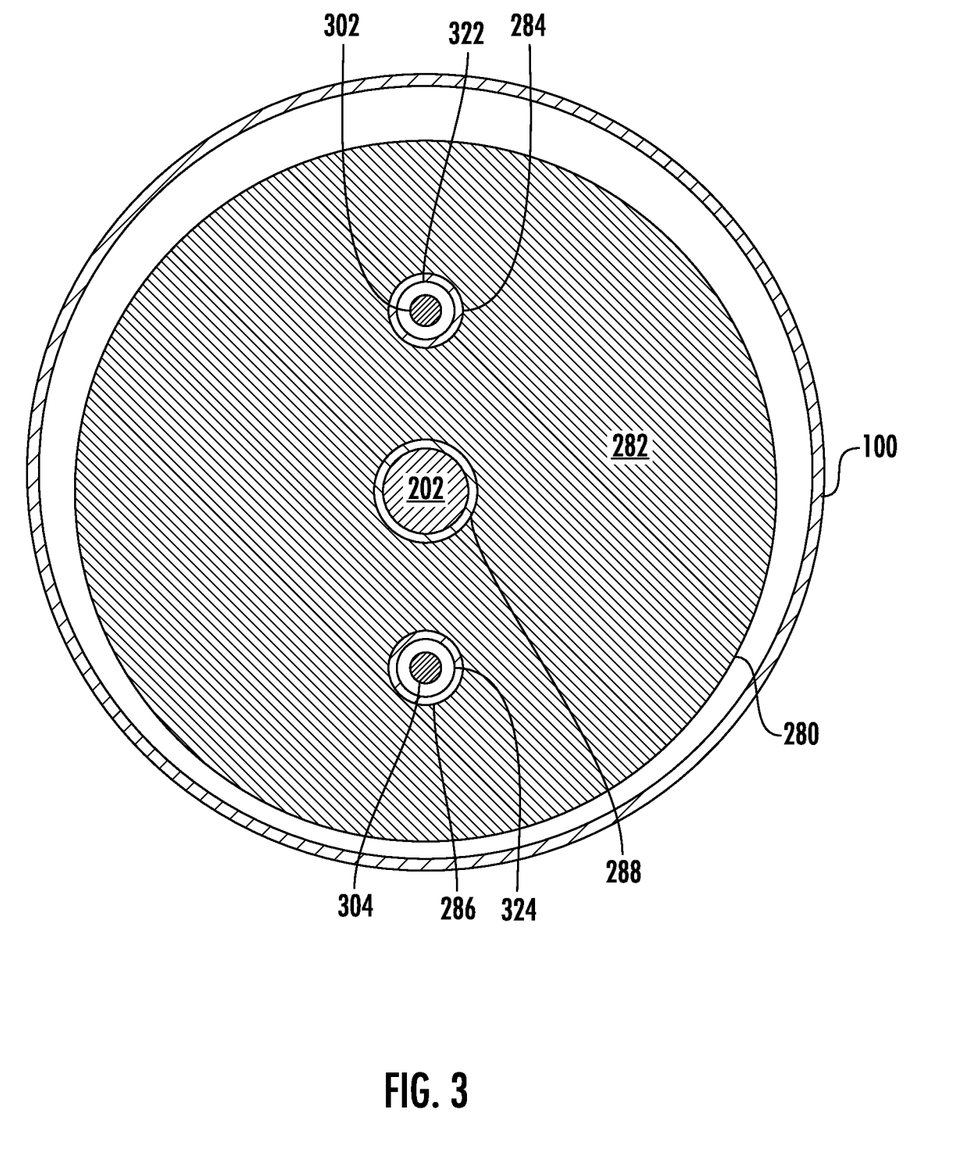
FIG. 3 is a forward view of the electric generation system of FIG. 2, according to an embodiment of the present disclosure.
Figure 4:
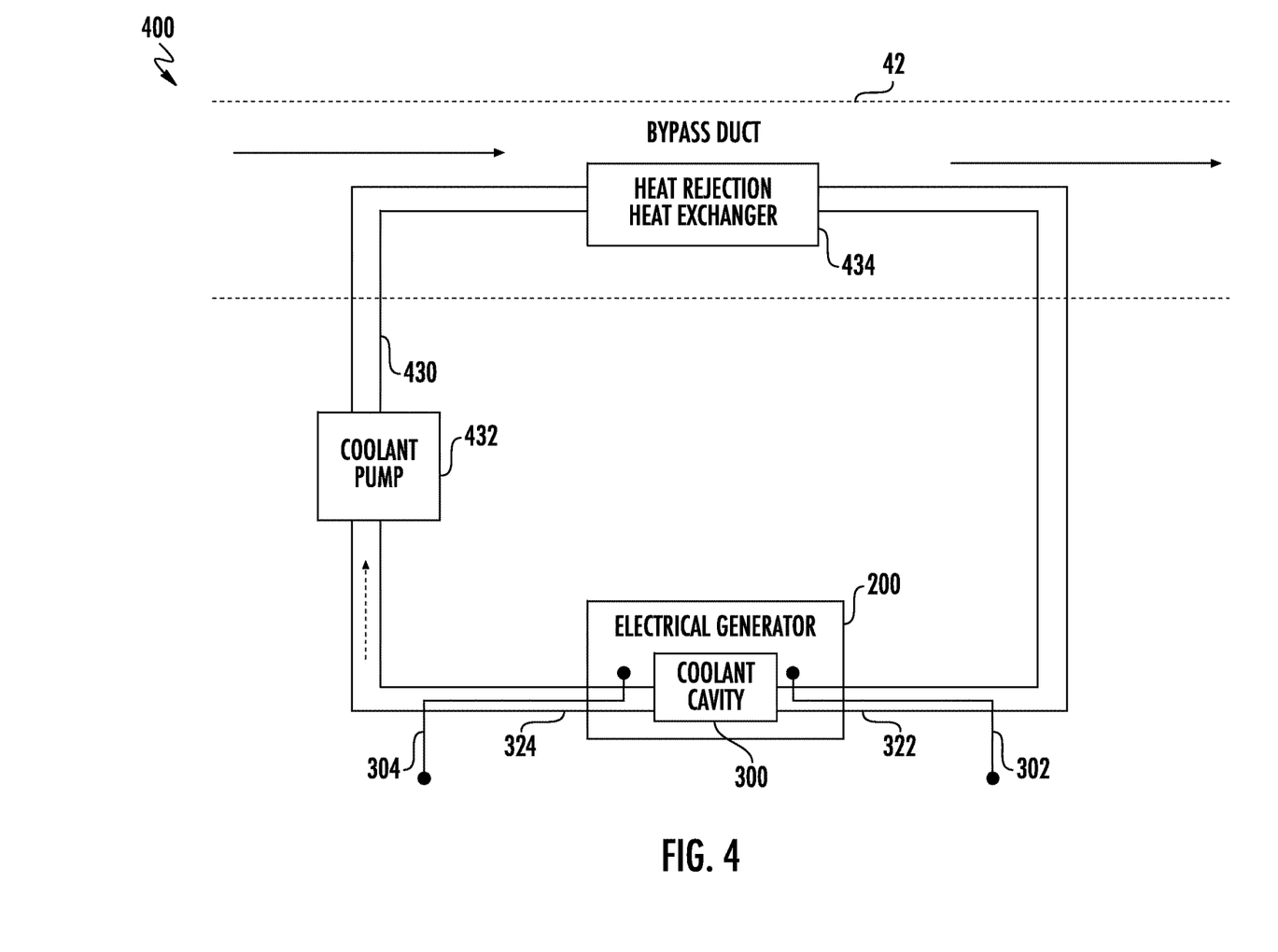
FIG. 4 is a schematic illustration of a heat exchanger system for use with the electric generation system of FIGS. 2 and 3, according to an embodiment of the present disclosure.

Referring now to FIGS. 3 and 4, with continued reference to FIGS. 1-2, a forward view of the forward wall 282 of the structural support housing 280 is illustrated in FIG. 3, in accordance with an embodiment of the present disclosure. The forward wall 282 may include a coupling opening 288, a first opening 284, and a second opening 286. The first opening 284 may be located gravitationally above the second opening 286. The drive shaft coupling 202 may extend through the coupling opening 288. A first coolant conveying tube 322 may extend through the first opening 284 and fluidly connect to the coolant cavity 300. The first coolant conveying tube 322 may be operable to supply coolant (e.g., cooled coolant) to a coolant cavity 300 of the electric generator 200 from a 434 of a heat exchanger system 400. The coolant cavity 300 may be in thermal communication with one or more components of the electric generator 200 that require heat removal, such as, for example, the main generator 220, the exciter generator 240, and the permanent magnet generator 260. The electric generator 200 may include one or more coolant cavities 300 that are enclosed within the electric generator 200. In an embodiment, the coolant may be oil. A second coolant conveying tube 324 may extend through the second opening 286. The second coolant conveying tube 324 may be operable to remove coolant (e.g., heated coolant) from the coolant cavity 300 the electric generator 200 and convey the heated coolant to the heat rejection heat exchanger 434 of the heat exchanger system 400.

A first electrical connector 302 extends through the first opening 284 within the first coolant conveying tube 322 to electrically connect to the electric generator 200. The first electrical connector 302 electrically connects the electrical generator 200 to components of the engine 20 or aircraft outside of the tail cone 100 that may require electricity from the electrical generator 200. The first electrical connector 302 is electrically connected to the main generator 220, the exciter generator 240, and the permanent magnet generator 260. The first electrical connector 302 is immersed in coolant by passing through the first coolant conveying tube 322. The coolant within the first coolant conveying tube 322 helps protect the first electrical connector 302 from elevated temperatures proximate the tail cone 100. The first electrical connector 302 may include a shield (not shown) to protect against the coolant.

A second electrical connector 304 extends through the second opening 286 within the second coolant conveying tube 324 to electrically connect to the electric generator 200. The second electrical connector 304 electrically connects the electrical generator 200 to components of the engine 20 or aircraft outside of the tail cone 100 that may require electricity from the electrical generator 200. The second electrical connector 304 is electrically connected to the main generator 220, the exciter generator 240, and the permanent magnet generator 260. The second electrical connector 304 is immersed in coolant by passing through the second coolant conveying tube 324. The coolant within the second coolant conveying tube 324 helps protect the second electrical connector 304 from elevated temperatures proximate the tail cone 100. The second electrical connector 304 may include a shield (not shown) to protect against the coolant.

Referring now to FIG. 4, with continued reference to FIGS. 1-3, a schematic illustration of the heat exchanger system 400 is illustrated, in accordance with an embodiment of the present disclosure. The heat exchanger system 400 removes heat from the electrical generator 200. As shown in FIG. 4, the heat exchanger system 400 may include at least one of a coolant pump 432, a heat rejection heat exchanger 434, and the coolant cavity 300 (i.e., heat absorption heat exchanger or evaporator) connected in fluid communication in a closed loop coolant circuit 430. The coolant cavity 300 may operate as a heat absorption heat exchanger of the heat exchanger system 400. The coolant used in the coolant circuit 430 may be an oil. It is to be understood that other components (not shown) may be incorporated into the coolant circuit 430 as desired.

Coolant may enter the coolant cavity 300 through the first coolant conveying tube 322 and exit the coolant cavity 300 through the out coolant conveying tube 324. The first electrical connector 302 may enter the electrical generator 200 through the first coolant conveying tube 322 and the second electrical connector 304 may exit the electrical generator 200 through the second coolant conveying tube 324.

The heat rejection heat exchanger 434 may operate to reject heat from the coolant circuit 432 that was absorbed by the coolant cavity 300. The heat rejection heat exchanger 434 may be in thermal communication with the bypass duct 42 of the engine 20. The heat rejection heat exchanger 434 may be located within the bypass duct 42 of the engine 20. Bypass air flowing through the bypass duct 42 may be used to absorb heat from the heat rejection heat exchanger 434. The heat absorption heat exchanger 434 may, for example, also comprise one or more coolant conveying coiled tubes or one or more tube banks formed of a plurality of coolant conveying tubes extending between respective inlet and outlet manifolds.

The coolant pump 432 may comprise a single-stage or multiple-stage compressor such as, for example, a reciprocating compressor or a scroll compressor. The coolant pump 432 has a compression mechanism (not shown) driven by a motor. The coolant pump 432 may be used to circulate coolant through the coolant circuit 430.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:
1. A gas turbine engine comprising:
   a tail cone having a cone shaped portion;
   a low pressure compressor;
   a low pressure turbine;
   a low speed spool interconnecting the low pressure compressor and the low pressure turbine; and
   an electric generator located within the cone shaped portion of the tail cone, the electric generator being operably connected to the low speed spool, wherein the electric generator comprises a coolant cavity in thermal communication with one or more components of the electric generator, and wherein the coolant cavity includes a top and a bottom, the electric generator being located between the top and the bottom;
   a structural support housing at least partially enclosing the electric generator, the structural support housing comprising a forward wall located on a forward end of the structural support housing, wherein the forward wall encloses the electric generator within the cone shaped portion, wherein the forward wall comprises a first opening and a second opening, and wherein the first opening is located gravitationally above the second opening;
   a first coolant conveying tube extending through the first opening to fluidly connect to the coolant cavity, wherein the first coolant conveying tube is configured to supply coolant to the top of the coolant cavity;
   a second coolant conveying tube extending through the second opening to fluidly connect to the coolant cavity gravitationally below an entirety of the electric generator, wherein the second coolant conveying tube is configured to remove coolant from the bottom of the coolant cavity, the bottom being located gravitationally below the entirety of the electric generator;
   a first electrical connector tube extending through the first opening within the first coolant conveying tube to electrically connect to the electric generator,
   wherein the first electrical connector tube extends forward from the electric generator while staying fully enclosed within the cone shaped portion of the tail cone until projecting forward through the forward wall; and a second electrical connector tube extending through the second opening within the second coolant conveying tube to electrically connect to the electric generator, wherein the second electrical connector tube extends forward from the electric generator while staying fully enclosed within the cone shaped portion of the tail cone until projecting forward through the forward wall.

2. The gas turbine engine of claim 1, further comprising:
a heat rejection heat exchanger fluidly connected to the first coolant conveying tube and the second coolant conveying tube.

3. The gas turbine engine of claim 2, further comprising:
a bypass duct, wherein the heat rejection heat exchanger is in thermal communication with the bypass duct.

4. The gas turbine engine of claim 2, further comprising:
a bypass duct, wherein the heat rejection heat exchanger is located within the bypass duct.

5. The gas turbine engine of claim 1, wherein the coolant is an oil.

6. An electric generation system for a gas turbine engine, the electric generation system comprising:
a tail cone having a cone shaped portion;
an electric generator located within the cone shape portion of the tail cone, the electric generator comprising a coolant cavity in thermal communication with one or more components of the electric generator, and wherein the coolant cavity includes a top and a bottom, the electric generator being located between the top and the bottom;
a structural support housing at least partially enclosing the electric generator, the structural support housing comprising a forward wall located on a forward end of the structural support housing, wherein the forward wall encloses the electric generator within the cone shaped portion, wherein the forward wall comprises a first opening and a second opening, and wherein the first opening is located gravitationally above the second opening;
a first coolant conveying tube extending through the first opening to fluidly connect to the top of the coolant cavity, wherein the first coolant conveying tube is configured to supply coolant to the top of the coolant cavity;
a second coolant conveying tube extending through the second opening to fluidly connect to the bottom of the coolant cavity gravitationally below an entirety of the electric generator, wherein the second coolant conveying tube is configured to remove coolant from the bottom of the coolant cavity, the bottom being located gravitationally below the entirety of the electric generator;
a first electrical connector tube extending through the first opening within the first coolant conveying tube to electrically connect to the electric generator,
wherein the first electrical connector tube extends forward from the electric generator while staying fully enclosed within the cone shaped portion of the tail cone until projecting forward through the forward wall; and
a second electrical connector tube extending through the second opening within the second coolant conveying tube to electrically connect to the electric generator, wherein the second electrical connector tube extends forward from the electric generator while staying fully enclosed within the cone shaped portion of the tail cone until projecting forward through the forward wall.

7. The electric generation system of claim 6, further comprising:
a heat rejection heat exchanger fluidly connected to the first coolant conveying tube and the second coolant conveying tube.

8. The electric generation system of claim 6, wherein the electric generator is configured to connect to a low speed spool of the gas turbine engine.

9. The electric generation system of claim 6, wherein the coolant is an oil.

10. A gas turbine engine comprising:
a tail cone having a cone shaped portion;
a low pressure compressor;
a low pressure turbine;
a low speed spool interconnecting the low pressure compressor and the low pressure turbine;
an electric generator located within the cone shaped portion of the tail cone, the electric generator being operably connected to the low speed spool, wherein the electric generator comprises a coolant cavity in thermal communication with one or more components of the electric generator, and wherein the coolant cavity includes a top and a bottom, the electric generator being located between the top and the bottom;
a structural support housing at least partially enclosing the electric generator, the structural support housing comprising a forward wall located on a forward end of the structural support housing, wherein the forward wall enclose the electric generator within the cone shaped portion, wherein the forward wall comprises a first opening and a second opening, and wherein the first opening is located gravitationally above the second opening;
a first coolant conveying tube extending through the first opening to fluidly connect to the top of the coolant cavity, wherein the first coolant conveying tube is configured to supply coolant to the top of the coolant cavity;
a first electrical connector tube extending through the first opening within the first coolant conveying tube to electrically connect to the electric generator;
a second coolant conveying tube extending through the second opening to fluidly connect to the bottom of the coolant cavity gravitationally below an entirety of the electric generator, wherein the second coolant conveying tube is configured to remove coolant from the bottom of the coolant cavity, the bottom being located gravitationally below the entirety of the electric generator;
a second electrical connector tube extending away from the electric generator in the forward direction through the second opening within the second coolant conveying tube to electrically connect to the electric generator;
a heat rejection heat exchanger fluidly connected to the first coolant conveying tube and the second coolant conveying tube;
a bypass duct, wherein the heat rejection heat exchanger is in thermal communication with the bypass duct; and
a coolant pump configured to pump coolant into the first coolant conveying tube and out of the second coolant conveying tube,
wherein the first electrical connector tube and the second electrical connector tube extend forward from the electric generator while staying fully enclosed within the tail cone until projecting forward through the forward wall.

11. The gas turbine engine of claim 10, wherein the coolant is an oil.

\* \* \* \* \*